United States Patent [19]

de Crepy et al.

[11] 4,146,746

[45] Mar. 27, 1979

[54] DEVICE FOR COMPUTING AND DISPLAYING THE PRICE OF A SERVICE

[75] Inventors: Edouard de Crepy, Paris; Pierre Le Buhan, Franconville, both of France

[73] Assignee: Societe Anonyme Francaise des Appareils Automatiques SAFAA, Paris, France

[21] Appl. No.: 791,783

[22] Filed: Apr. 28, 1977

[30] Foreign Application Priority Data

Apr. 30, 1976 [FR] France ................................ 51 12926

[51] Int. Cl.² ........................................... H04M 15/10
[52] U.S. Cl. .......................... 179/7.1 TP; 179/18 DA
[58] Field of Search ............. 179/7 R, 7.1 R, 7.1 TP, 179/8 R, 90 AN, 18 DA, 6.3 CC, 18 D, 2 CA, 6.3 R; 235/442 TE, 91 E

[56] References Cited

U.S. PATENT DOCUMENTS

| | | | |
|---|---|---|---|
| 3,097,266 | 7/1963 | Luscher | 179/7 R |
| 3,794,783 | 2/1974 | Radu | 179/7.1 TP |
| 3,920,912 | 11/1975 | Anderson et al. | 179/7.1 TP |
| 4,008,377 | 2/1977 | Szczepanski et al. | 179/7.1 TP |

FOREIGN PATENT DOCUMENTS

| | | | |
|---|---|---|---|
| 2112709 | 7/1972 | Fed. Rep. of Germany | 179/7.1 R |
| 2336102 | 2/1975 | Fed. Rep. of Germany | 179/7.1 R |

*Primary Examiner*—Kathleen H. Claffy
*Assistant Examiner*—Gerald L. Brigance

[57] ABSTRACT

This device comprising a pulse receiving circuit, a computer interface circuit responsive to a logic adaptor circuit and delivering, as tax accumulation data are delivered to the device, a signal corresponding to the price of each unitary tax, an adder circuit connected to the output of said computer interface circuit for summing the prices of the various unitary taxes accumulated since the device had been reset for the last time, and a announcer for displaying this sum corresponding to the price to be paid for the service rendered. With this device, it is possible to easily check a debit corresponding to a service rendered, by calculating and displaying the sum to be paid.

10 Claims, 5 Drawing Figures

DEVICE FOR COMPUTING AND DISPLAYING THE PRICE OF A SERVICE

BACKGROUND OF THE INVENTION

The present invention to device adapted to be coupled to means presenting a service of which the price can be calculated as a function of a predetermined number of unitary taxes depending each in a known manner on the value of a basic tax, said means being adapted to transmit to said device data corresponding to the appearance of the various unitary taxes, said device comprising a pulse receiving circuit detecting said data, a logic adaptor circuit connected to said receiving circuit, a computing interface circuit responsive to said logic adaptor circuit and adapted, as new taxes accumulate in the device, to deliver a signal corresponding to the price of each unitary tax, and adder circuit coupled to the output of said computing interface circuit for adding the prices of the various unitary taxes accumulated since the last resetting of the device, and a first announcing member displaying said sum corresponding to the price to be paid for the service rendered.

The user of a public or private service, for example the subscriber of a telephone line connected to a telephone exchange, may allow a third person, referred to hereinafter as "a temporary user", to take advantage of this service against the payment of a predetermined sum.

This sum depends in general on a function $f(n, t, \ldots)$ of several variables $(n, t \ldots)$ known to the user, at least when the service has been utilized. In the above example and assuming that the telephone line is designed for retransmitting counting pulses, the sum to be paid by the temporary user depends on the value of a basic tax and also on the number n of unitary call charges $t_j (j = 1$ to n) applied during the call or calls made by this temporary user, each unitary call charge depending in a known manner on the value of the basic tax t.

At present devices are known which permit of displaying the number n of unitary taxes or call charges to be entered into the subscriber's account. However, it is not sufficient to know this number n for determining directly the value of the sum to be paid to the user, for the relationship $f(n, t \ldots)$ may be relatively complex and evolve periodically. It is therefore necessary to use tables the existence of which if generally unknown to, and beyond the control of, the temporary users; in other words, present conditions facilitates both frauds and misuses.

SUMMARY OF THE INVENTION

It is the essential object of this invention to provide means enabling a temporary user to check this reckoning, by providing a device capable of computing and displaying directly the price to be paid by the temporary user for the service rendered or involved.

The device according to this invention is essentially characterized in that the computer interface circuit comprises means for memorizing the number of taxes received by the device and programming means, said memorizing and programming means being coupled to a computing unit adapted to deliver a signal corresponding to the unitary price of a tax of a given rank as a function of this rank.

BRIEF DESCRIPTION OF THE DRAWINGS

Although the device according to the instant invention can be operated in conjunction with all types of means presenting a service and meeting the above-mentioned requirements, a typical application of this device to telephone sets or stations will now be described with reference to the accompanying drawings, in which.

DESCRIPTION OF THE PREFERRED EMBODIMENT

Figure 1:
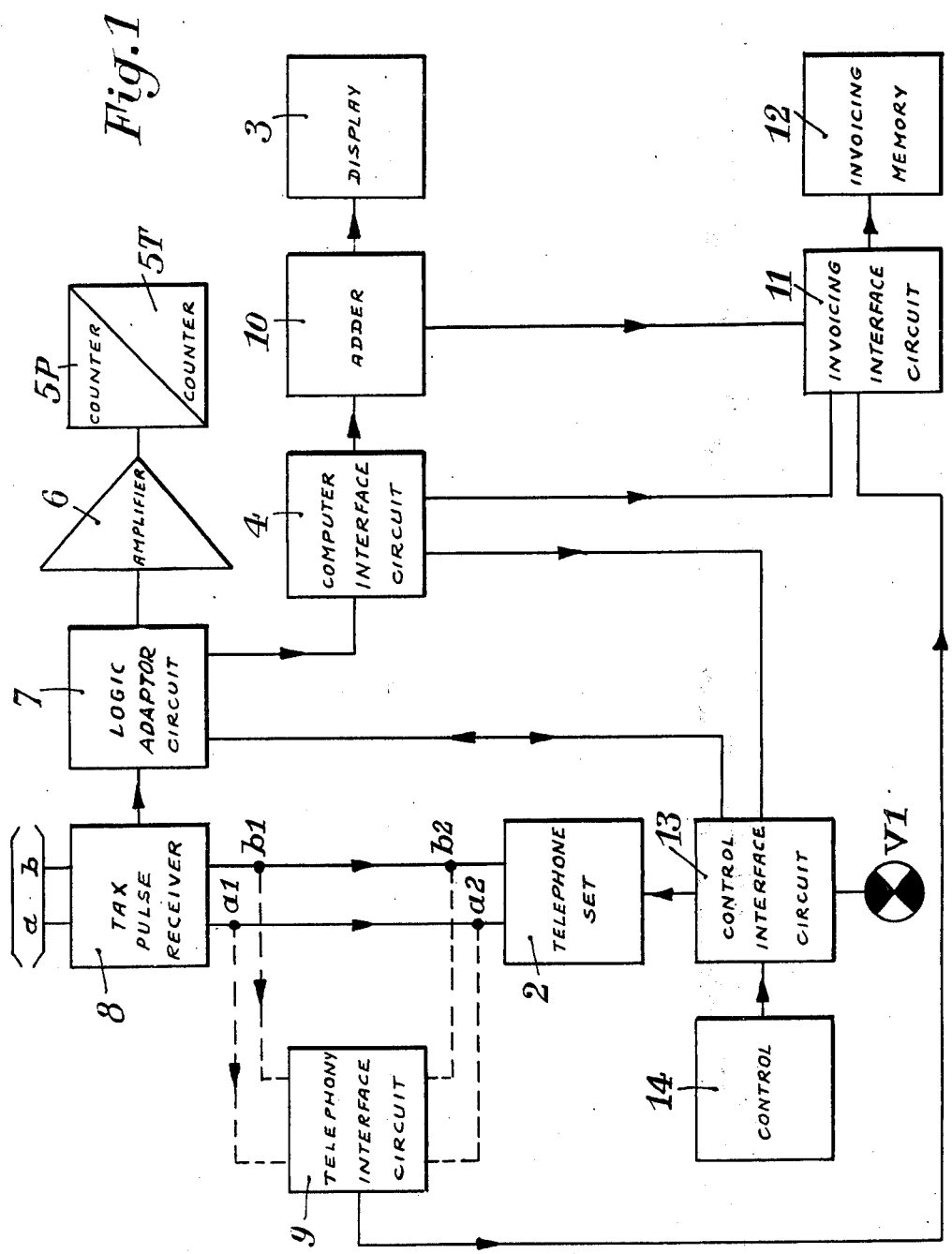
FIG. 1 is a block diagram illustrating the mode of operation of the device according to this invention.

In the embodiment illustrated by way of example in the attached drawings the device according to the invention is coupled to a common telephone set 2 of which the keyboard or dial may be neutralized with respect to the telephone exchange for preventing the unauthorized use of the telephone line a, b.

This device comprises essentially a pulse receiving circuit 8, a computer interface circuit 4, an adder circuit 10 and a display member 3.

The device of the instant invention may also comprise control elements 14 and a control interface circuit 13 for authorizing or blocking the transmission of the call number to the telephone exchange from the telephone set 2 and also of checking the value of the first unitary tax or call charge, an electromechanical counter 5 giving the partial and total number of taxes, a pilot lamp $V_1$ and an invoicing memory 12 delivering for example a toll-ticket for one or a plurality of well-defined consecutive calls.

Firstly, reference will be made to FIG. 1 for describing the various steps involved in the utilization of the device.

1.1 When the device is inoperative, the operation of the keyboard or dial of the telephone set 2 is prevented by the interface circuit 13. The display member 3 displays a "zero" condition and pilot lamp $V_1$ is out. As long as the user does not actuate control members 14 consisting of a first member $BP_1$ and of a second member $BP_2$ (for example a pair of push-buttons) the device remains inoperative.

1.2 Assuming now that a temporary user is desirous to know the cost of the first unitary call charge or tax while the display member 3 shows "0", he actuates control member $BP_2$. Thus, an information is memorized into interface circuit 13 and controls a counting cycle similar to that of a tax or call charge pulse in adder circuit 10 through the medium of the logic adaptor circuit 7 and computer interface circuit 4. However, no tax or call charge is displayed by the electromechanical counter 5.

At the end of the computing cycle, the assembly being initially in its "0" condition, the display member 3 shows the value of the first call charge. Pilot lamp $V_1$ remains dark and the keyboard or dial is still locked or inoperative.

When the user releases control member BP₂, the control interface circuit detects this condition and issues an order for resetting the adder 10, keeping the pilot lamp V₁ de-energized and locking the keyboard or dial against movement.

1.2 If the user agrees that the temporary user utilizes his telephone set, he actuates an other member BP₁, and this action may if desired reset the partial counter 5P, the totalizer counter 5T remaining inoperative. The actuation of member BP₁ is memorized in control interface circuit 13, with the consequence that:

pilot lamp V₁ is lighted,
the dial or keyboard of telephone set 2 is released and ready to operate.

Therefore, the temporary user can dial the number of the called subscriber.

1.4 If the user actuated member BP₂ without the display of any call charge received from the telephone exchange, the condition described in paragraph 1.2 is restored completely.

1.5 If the temporary user is eventually connected to the called telephone subscriber, a call charge pulse is delivered by the exchange, recorded by the tax receiver 8 and processed by the logic adaptor circuit 7 so as to:

deliver a gauged counting pulse to the electromagnetic counter 5P, 5T via amplifier 6.
control a counting cycle in the computing interface circuit 4.

The scope of this control action is to permit the recording in adder 10 of the price of the first call charge or tax. Under these circumstances, the display member 3 shows the state of adder 10, i.e. the price corresponding to this first unit. An internal decoding action produced in interface circuit 4 issues to the control interface circuit 13 the order for electrically locking the control member BP₂ to prevent any further actuation of this member from being taken into account.

On the other hand, the first call-charge pulse is attended by the locking of the dial or keyboard of the telephone set, together with the putting out of pilot lamp V₁.

1.6 The temporary user can now talk with the called telephone subscriber. If another call-charge pulse appears, it is recorded like the preceding ones by the call-charge or tax receiver 8 and processed by the logic circuit 7 so as to deliver a call-charge unit to the electromagnetic counter 5P, 5T of which the partial section 5P displays two units, and thus control the computer interface circuit 4 so that the latter delivers to adder 10 the data necessary for recording an additional unit. The announcer 3 thus displays the price corresponding to two call-charge units.

1.7 As the call-charge pulses appear, the corresponding price or sum is added to the preceding debit in adder 10, the result being displayed by the announcer 3 and the partial call-charges by counter 5P.

The computer interface circuit 4 delivers signals for controlling the adder 10 from:

(a) data concerning the price of the basic tax, which may be:

($a_a$) either programmed as wired logic (plug-in printed circuit comprising the necessary connections, such as flip-flop switches, etc. . . .), ($a_b$) or programmed by the telephone line without any local intervention of the personnel. For this purpose, a sequence of pulses at a frequency of 12 KHz and a rate such that they cannot be intermingled with call-charge pulses are fed for example to the telephone line. The pulse receiver 8 receives these signals and these are identified by the logic circuit 7 and delivered to the computer interface circuit 4 in order automatically to change the programming thereof.

(b) data connecting the number of call-charges to the price to be paid.

This relationship, illustrated by the function f (n, t), in which t is known, may evolve according to a programming similar to that described in the above paragraphs ($a_a$) and ($a_b$). It may for example assume one of the following shapes:

the value of the unitary call-charge evolves gradually as a function of the number of call-charges accumulated:

| order of unitary call-charges | Stage number | Price of unitary call-charge | Sum to be paid (S) |
|---|---|---|---|
| Ex. 1$^{st}$ | 1$^{st}$ | $k_1 t$ | $S_1 = k_1 t$ |
| 2$^{nd}$ | 2$^{nd}$ | $k_2 T$ | $S_2 (k_1 + k_2)t$ |
| 3$^{rd}$ | | $k_2 t$ | $S_3 = (k_1 + k_2)t$ |
| 4$^{th}$ | 3$^{rd}$ | $k_3 t$ | $S_4 = (k_1 + 2k_2 + k_3)t$ |
| n$^{th}$ | | $k_3 t$ | $S_n = t[k_1 + k_2 + (n-3)k_3]$ |

$k_1, k_2, k_3$ being constants that can be programmed if desired

The call-charge value evolves according to any suitable function f = (n, t . . .) in which t is a parameter concerning for example a fixed duty of a telephone-box tax.

(c) the number of call charges received from the telephone exchange for the telephone connection in progress.

The computer interface circuit 4 comprises the circuit means necessary for calculating the sum to be paid, n and t being known.

This computing circuit 4 may control the adder either through a series computing control member or through a parallel computing control member.

The adder 10 comprises the circuit means necessary for memorizing, from the data delivered by interface circuit 4 in connection with a tax of rank i, the result of the summation of the prices corresponding to the previous call-charges (up to rank i-1) and the price corresponding to the call charge of rank: 1.8) The telephone talk proceeds normally until the temporary user hangs up the hand microphone and can read clearly, like the user proper of holder of the telephone set, the price to be paid.

As long as the user does not actuate control member BP1, the device is maintained in the above-described condition, the actuation of control member BP2 having been locked electrically (see paragraph 1.5). If the user actuates control member BP1, the device resumes the condition described in paragraph 1.3.

1.9 If after actuating control member BP1 the user wishes to lock the keyboard or dial of his telephone set 2, he simply actuates control member BP2 and the device resumes the condition described in paragraph 1.2.

1.10 Optionally, the device of this invention may deliver a record stating for example the price paid, the number of call-charges, the called telephone number, the identification mark of the device, etc. For this purpose, the telephony interface circuit 9 inserted in series in the telephone lines detects hand microphone.

During this last-mentioned action, the interface circuit 9 issues an order to the invoicing interface circuit 11 for recording in the invoicing memory 12 all the data memorized by said interface circuit 9 in the adder 10 and also in the computing interface circuit 4 comprising in this case a partial counter for the call-charge pulses.

1.11 If the telephone connections go beyond the capacity of adder 10, an overstepping memory incorporated in this adder may control the cutting-off of the telephone connection in progress or warn the user of this overstepping.

1.12 The control members 14 may be replaced by a coded card introduced by the temporary user and acknowledged as valid by the device, or by a checking or monitoring sand imputation device similar to the one described and illustrated in the copending patent application filed by the same Applicants entitled: "Automatic Device for Carrying Out a Service or Sale on Credit"

The detailed description of the device of this invention will now be made with reference to FIGS. 2 to 5 of the attached drawings, in these Figures the symbol

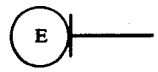

denotes a positive electric supply point.

2.1 Let us assume that a relationship between the prices $S_i$ of the unitary call charges, between the numbers n of these unitary call charges, and between the price t of a basic tax, has the following shape:

| | |
|---|---|
| If n = 1 | $S_1 = t$ |
| n = 2 | $S_2 = 2t$ |
| n = 3 | $S_3 = 2t + T$ |
| n = k | $S_k = 2t + (k - 2) T$ |

The prices of call-charges t and T may vary for instance between 20 cents and 2 $ the increment variation being 20 cents. The prices of taxes t and T are displayed by means of switches INT t and INT T having two stable positions.

Moreover, the telephone set 2 may comprise a dial having a transmitter contact 2a adapted to be short-circuited.

The capacity of the announcer may be limited for example to two decades.

Figure 4:
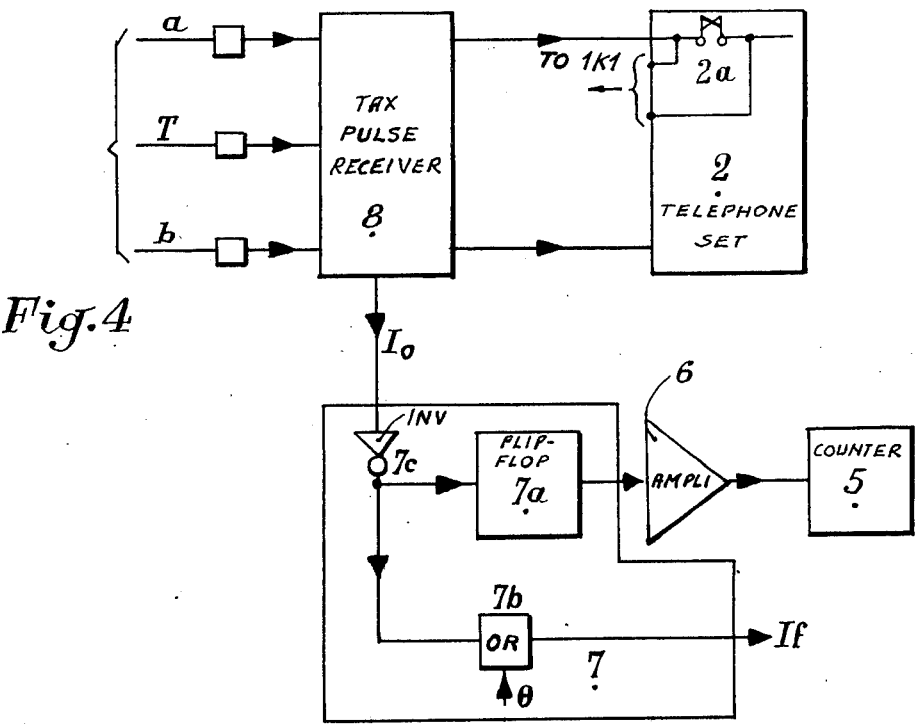
FIG. 4 is a diagram illustrating the mode of operation of one portion of the device according to this invention.

2.2 After switching-in the device, the memory 13.d (consisting for example of a MOTOROLA MC 14013 type circuit) of control interface circuit 13 (FIG. 3) is in position "3", so that the pilot lamp $V_1$ is de-energized and relay $K_1$ is in its inoperative position, with its contact $1K_1$ closed for short circuiting the aforesaid contact 2a of telephone set 2 (FIG. 4). In addition, the decades 10a and 10b (FIG. 5) of adder 10 are in state "0", whereby the announcers 3a1 and 3b1 (FIG. 5) display "0".

2.3 If the temporary user wishes to know the amount of the first unitary call charge while the announcer displays zero, the user actuates member $BP_2$. With this action, the control interface circuit 13 (FIG. 3):

2.3.1 Delivers a pulse $\theta$ at the beginning of the action exerted on BP2, via:
an AND gate 13a receiving a signal "1" at its other input;
an ascending wavefront differentiator 13c.

2.3.2 Sets the memory 13d in state "0" (in case this memory were not already in this state) by means of said pulse $\theta$.

Thus, relay K1 remains inoperative and pilot lamp VI remains de-energized.

2.3.3 Sets memory 13l (for example of the MOTOR-OLA MC 14013 type) in state "1", thus releasing the input of an AND circuit 13m controlling the resetting (see paragraph 2.3.4 hereinafter).

2.3.4 The pulse signal $\theta$ controls the counting cycle in adder 10 according to the following procedure:

2.3.4.1 Pulse is transmitted via an OR circuit 7b (FIG. 4) to the input If of the computer interface circuit. This pulse also denoted If does not control the counting in the electromechanical counter 5P, 5T.

Figure 2:
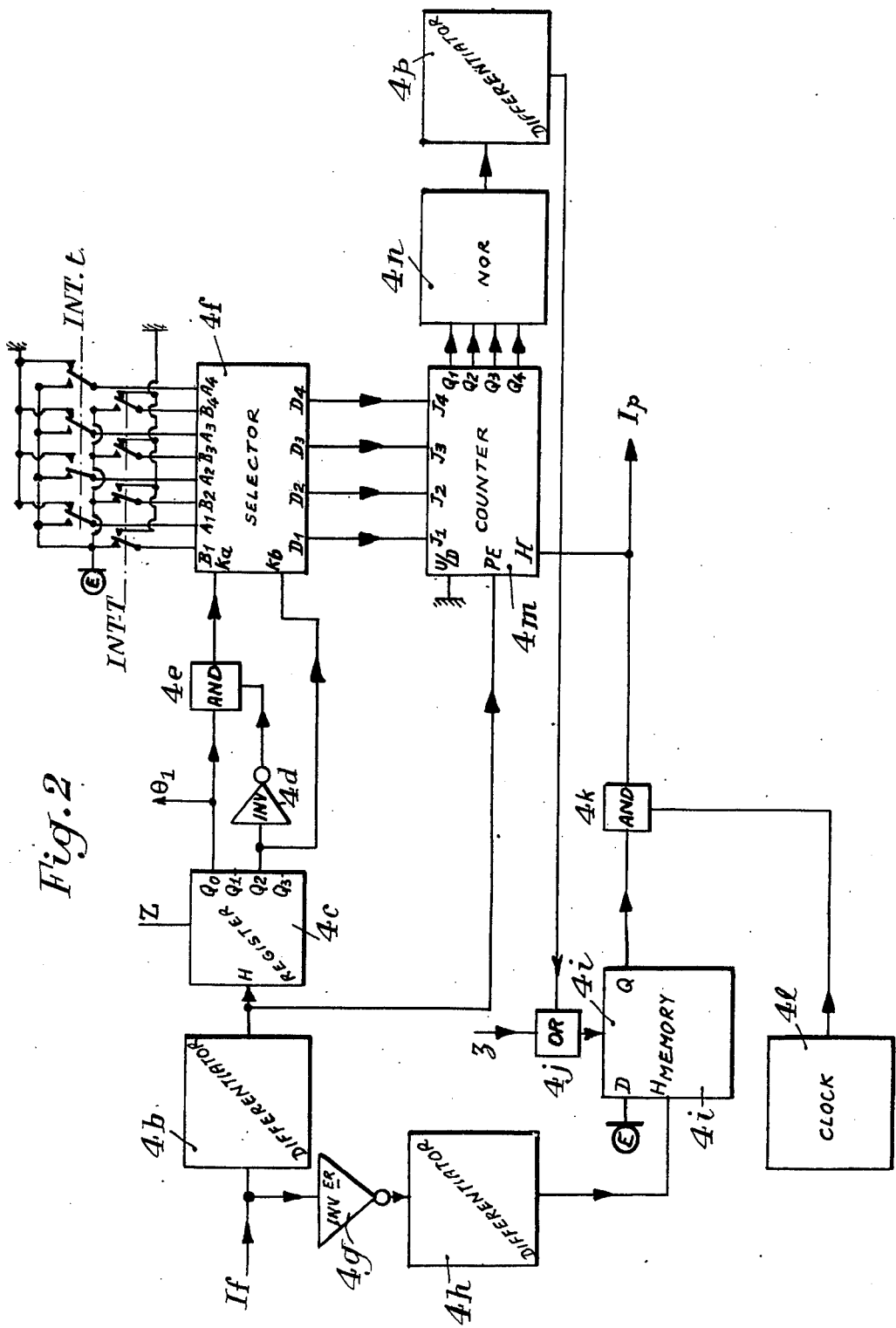
FIG. 2 is possible diagram of a detail of the computer interface circuit utilized in the device of this invention.
Figure 3:
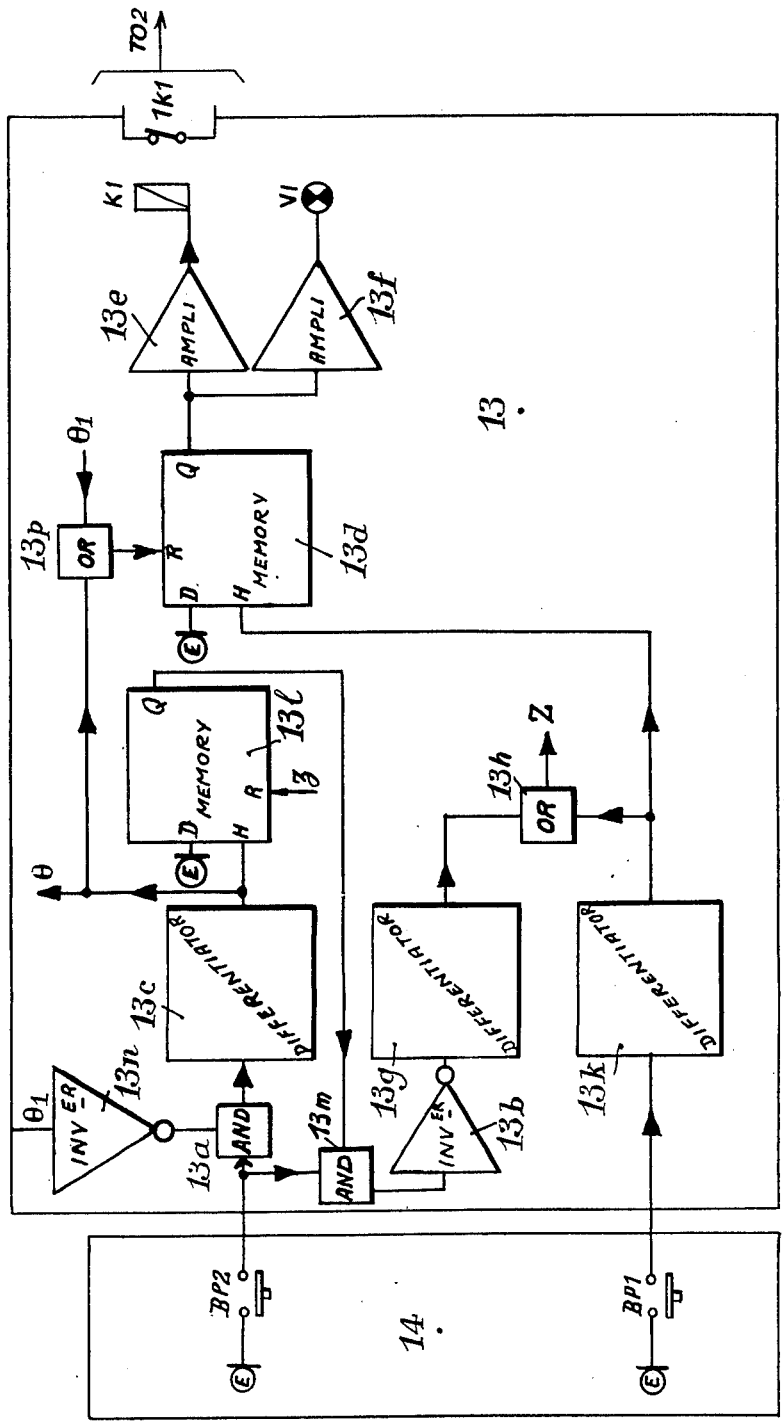
FIG. 3 is a possible diagram of the detail of control components and also of a control interface circuit suitable for use in the device of this invention.

2.3.4.2 Now let us consider in FIG. 2 the counting process applied to the first call charge.

(2.3.4.2a) The ascending wavefront of pulse If is differentiated by a differentiator 4b of known type.

(2.3.4.2b) The thus delivered pulse:
is introduced into a register 4c (consisting for instance of a half-circuit of the RCA CD 4015 type) of which one output $Q_o$ changes to state "1"; consequently, the data coded according to the binary code BCD on switches INT t for programming the selection of price t are transferred to the inputs J1, J2, J3 and J4 of a down-count 4m (for example of the RCA CD 4029 type), said date being available on inputs A1, A2, A3 and A4 of an AND/OR circuit 4f (such as an RCA CD 4019 type circuit);
preselects the down counter 4m in the state of the price of the first call charge t (which states are present at inputs J1 to J4).

(2.3.4.2.c) On the descending wavefront of pulse signal If a differentiator 4h of known type delivers a pulse via inverter 4g.

This pulse is memorized in a memory 4i (for example of the RCA CD 4013 type) having an output Q in state "1" adapted to release the input of an AND circuit 4k.

The input H of down counter 4m then receives the pulses $I_p$ from a Clock 4l.

(2.3.4.2.d) If for instance the tax t is to be paid 40 cents, down counter 4m is initially preselected in state 2.

(2.3.4.2.e) The first pulse Ip changes this down counter to state "1", the second pulse changes it to state "0", this last-mentioned state being decoded by a NOR circuit 4n and differentiated by a differentiator 4p of which the output signal resets the memory 4i through the medium of an OR circuit 4j; consequently, the input of AND gate 4k is blocked, so that only two pulses Ip can be delivered.

Figure 5:
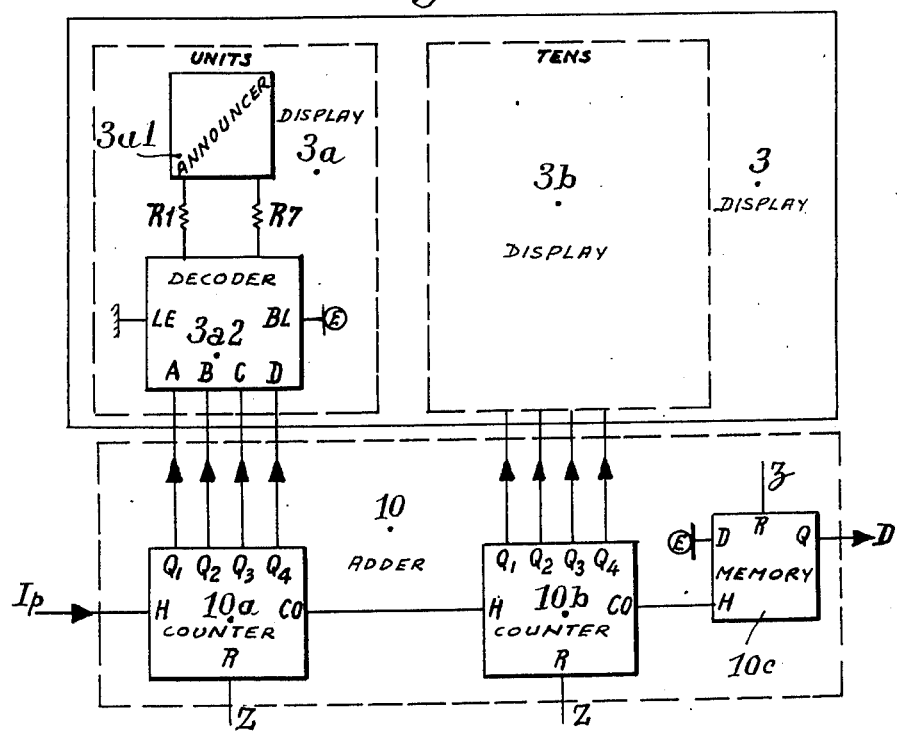
FIG. 5 is another diagram showing the adder circuit and the display elements.

2.3.4.3 Le us consider FIG. 5.

The two pulses $I_p$ are accounted in the first decade 10a of adder 10. This decade is decoded by decoder 3a2 (for example of the RCA CD 4511 type) controlling the display decade 3a 1, consisting for example of a type 5082 Hewlett Packard announcer.

Therefore, at the end of the counting cycle, the display member or announcer 3 displays the value of tax t (02 in this example).

2.3.4.4 If the user releases control member BP2, a differentiator 13g (FIG. 3) delivers via an AND gate 13m and an inverter 13b a resetting pulse controlling the input of an oOR circuit 13h delivering at its output the signal z for restoring the complete device to the condition described in paragraph 2.2.

2.4 If the user is desirous to grant the service to the temporary user, he actuates control member BP1.

The above-mentioned differentiator 13k (FIG. 3) delivers at its output a pulse which:

sets memory 13d in state "1", so that the pilot lamp V₁ is switched on and relay K1, of which contact 1K1 is no more in parallel with contact 2a (FIG. 4) of the dial of telephone set 2, is energized; therefore, the user can dial the number of the called telephone subscriber;

delivers via OR circuit 13h a resetting signal z restoring the complete device to its initial condition, if it had not already resumed this condition.

2.5 If the user actuates member BP2 before any call charge has been delivered from the telephone exchange (θ 1 to "0"), the conditions and process described in paragraph 2.3 are restored.

2.6 If the temporary user obtains the telephone connection with the called subscribed, a call charge pulse is delivered from the exchange and recorded by the pulse receiver 8 (FIG. 4). This receiver of a known type may be associated for example with a 12KHz/50Hz converter and delivers at its output a signal Io at "0" when a call charge pulse for example at the same frequency (12 KHz) is delivered by the exchange.

This signal Io inverted by inverter 7c (FIG. 4):

2.6.1 Causes a calibrated counting pulse to be fed to the electromechanical counter 5 via a monostable flip-flop 7a and an amplifier 6.

2.6.2 Controls a counting cycle in interface circuit 4; in fact, the output If of OR circuit 7b switches to "1" during the pulse time Io. This pulse If is fed to the input of interface circuit 4 and the process resulting therefrom has already been described in paragraphs 2.3.4.2 and following ones. Therefore, the announcer 3 displays the value of the first call charge t.

It will be seen that when the signal θ delivered from interface circuit 4 changes to "1", the output of inverter 13n (FIG. 3) changes to "0", thus locking electrically the action of control member BP2.

Moreover, the memory 13d (FIG. 3) changes to "0" since signal 1 is in state "1", relay K1 dropping and short-circuiting contact 2a of the telephone set dial (see FIG. 4), thus preventing the temporary user from dialling another number on the telephone line and causing the pilot lamp V1 to go out.

At the end of the first call charge, the adder 10 (FIG. 5) remains in state t and the temporary user can talk with the called subscriber.

2.7 If another call-charge pulse Io appears, it produces as before:

2.7.1 A call-charge pulse directed to counter 5,
2.7.2 A pulse If.

On the ascending wavefront of If the register 4c (consisting for example of one-half of a RCA type CD 4015 circuit) (FIG. 2) makes a one-step advance (second step), the output Qo of this register remaining at "1", the output of AND circuit 4e remaining likewise at "1".

Thus, the signals at the preselection inputs J1 to J4 of down counter 4m will remain those corresponding to call charge t.

Thus, the number of pulses Ip will be equal to the number of counting increments corresponding to the value of this call charge.

The adder 10 will thus register the pulses Ip delivered for this second call charge and the announcer will display the price corresponding to 2t.

2.8 If a third call-charge pulse appears:
2.8.1 It is recorded in counter 5, and
2.8.2 Produces a pulse If.

On the ascending wavefront of If the register 4c advances by one step (third step) and the output 02 comes to "1", so that the output of AND circuit 4e switches to state "0" via inverter 4d and the input Kb of selector 4f switches to state "1".

Consequently, the signals available at the preselection inputs J1 to J4 of down counter 4m are those corresponding to the price of call charge T and are fed to the inputs B1 to B4 of selector 4f via programmation switches INT T (set at 3 Fr in FIG. 2).

As already explained in the foregoing, there will appear as many pulses Ip as there are counting increments in call charge T.

At the end of the counting cycle, the adder 10 will have recorded the price corresponding to 2t + T, this price being displayed by the announcer 3.

2.9 The telephone connection and talk continue normally until the temporary user, having hung up the hand microphone, can read in plain figures the price to be paid.

As long as the user does not actuate member BP1 or BP2, the complete device remains in this condition. If he actuates either of these control members, the operation resulting therefrom is the same as that described hereinabove.

2.10 Optionally, the device may deliver a recorded or printed voucher or toll-ticket showing for instance the price to be paid, the number of taxes and the called number.

In this case the necessary circuits (9, 11, 12), from the point of view of recording, are similar to those described in the above-mentioned co-pending patent application.

2.11 When the capacity of adder 10 is overstepped, this overstepping is recorded by a memory 10c (for example of the MOTOROLA MC 14013 type) (FIG. 5) and the output Q of this memory delivers a signal D that can be used for informing the user or cutting off the telephone line.

Of course, the specific form of embodiment described hereinabove should not be construed as limiting the scope of the present invention since many modifications and changes may be brought thereto without departing from the basic principles of the invention as set forth in the appended claims. These modifications and changes will readily occur to those conversant with the art and therefore a detailed description thereof is not deemed necessary.

What is claimed as new is:

1. A device for computing and displaying the price of a service and adapted to be coupled to subscriber's means presenting a service depending on a price to be paid, which price is a sum of successive unitary taxes having each a rank of occurrence and a value, the occurrence of the successive taxes being fixed by corresponding tax pulses occurring successively and transmitted from said service presenting means to said device, wherein the value of each unitary tax is a known function on the one hand of its rank of occurrence and on the other hand of a fixed basic tax, said device comprising:

a pulse receiving circuit detecting said tax pulses,
a logic adaptor circuit connected to said pulse receiving ciurcit,
a computing interface circuit responsive to said logic adaptor circuit and comprising means for memorizing the tax pulses having occurred, programming means for programming said known function, and a computing unit, said computing interface circuit being adapted, as said tax pulses are transmitted to the device, to deliver an output signal corresponding to the respective value of each one of the successive unitary taxes, an adder circuit receiving the output signal of said computing interface circuit and performing said sum by adding the values of the unitary taxes having occurred since a resetting of the device, and a first annoucing member displaying said sum corresponding to the price to be paid for said service.

2. Device according to claim 1, wherein said means presenting a service comprise a telephone set in a telephone system.

3. Device according to claim 2, further comprising means for blocking said service presenting means when a predetermined number of tax pulses have occurred.

4. Device according to claim 1, compprising a first counter connected to the logic adaptor circuit for totalizing the taxes for permanent services rendered to the subscriber and a second counter connected to the logic adaptor circuit for totalizing separately any services rendered to a temporary user of the device.

5. Device according to claim 1, further comprising a control interface circuit and control members operatively connected to said service presenting means for controlling a display on said first announcing member of the value of the first unitary tax when said service presenting means are inoperative.

6. Device according to claim 5, wherein said control members consist of push-buttons.

7. Device according to claim 1, further comprising a control interface circuit and control members operatively connected to said service presenting means for making said service presenting means inoperative.

8. Device according to claim 7, further comprising a second announcing member for indicating when said service presenting means is operative.

9. Device according to claim 1, further comprising means connected to said computing interface circuit for recording the price of the service rendered.

10. Device according to claim 1, further comprising an invoicing interface circuit operatively connected to said adder circuit, and connected to said invoicing interface circuit for issuing a receipt for the price paid.

* * * * *